US010613305B2

(12) United States Patent
Jia et al.

(10) Patent No.: US 10,613,305 B2
(45) Date of Patent: Apr. 7, 2020

(54) TILED DISPLAY PANEL AND TILED DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Lili Jia, Beijing (CN); Hao Zhou, Beijing (CN); Weihao Hu, Beijing (CN); Liang Zhang, Beijing (CN); Yu Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 195 days.

(21) Appl. No.: 15/658,381

(22) Filed: Jul. 24, 2017

(65) Prior Publication Data

US 2018/0052312 A1 Feb. 22, 2018

(30) Foreign Application Priority Data

Aug. 18, 2016 (CN) .......................... 2016 1 0683876

(51) Int. Cl.
*G02B 5/04* (2006.01)
*G02B 17/08* (2006.01)
(Continued)

(52) U.S. Cl.
CPC ......... *G02B 17/086* (2013.01); *G02B 5/0231* (2013.01); *G02F 1/13336* (2013.01);
(Continued)

(58) Field of Classification Search
CPC .......... G02B 5/02; G02B 5/0205; G02B 5/04; G02B 17/00; G02B 17/04; G02B 17/06; G02F 1/13336; G02F 1/133524
See application file for complete search history.

(56) References Cited

U.S. PATENT DOCUMENTS 9,612,468 B1* 4/2017 Liu .................... G02F 1/13336
9,638,946 B2 5/2017 Lee et al.
(Continued)

FOREIGN PATENT DOCUMENTS

CN 102216972 A 10/2011
CN 103903519 A 7/2014
(Continued)

OTHER PUBLICATIONS

First Chinese Office Action, for Chinese Patent Application No. 201610683876.X, dated May 4, 2018, 13 pages.

*Primary Examiner* — Thong Q Nguyen
(74) *Attorney, Agent, or Firm* — Kinney & Lange, P.A.

(57) ABSTRACT

A tiled display panel and a tiled display device are disclosed. The tiled display panel includes: at least first and second adjacent display areas; a splice area disposed between the first and second adjacent display areas; a first optical element and a second optical element respectively disposed on the first and second display areas and located on two sides of the splice area; and a reflective element disposed on the splice area. Each of the first optical element and the second optical element is configured to direct at least a portion of light emitted from its respective display area to the reflective element, such that the at least a portion of light is reflected by the reflective element and then emitted out from the splice area.

20 Claims, 3 Drawing Sheets

(51) Int. Cl.
*G02F 1/1335* (2006.01)
*G02B 5/02* (2006.01)
*G02F 1/1333* (2006.01)

(52) U.S. Cl.
CPC ...... *G02F 1/133524* (2013.01); *G02B 5/0226* (2013.01); *G02B 5/04* (2013.01)

(56) References Cited

U.S. PATENT DOCUMENTS

| | | |
|---|---|---|
| 2011/0255301 A1 | 10/2011 | Watanabe |
| 2012/0293744 A1 | 11/2012 | Watanabe |
| 2014/0078778 A1* | 3/2014 | Moriwaki ............ G09F 9/3026 362/610 |
| 2014/0168786 A1* | 6/2014 | Lee .................... G02B 27/1066 359/638 |
| 2015/0015974 A1* | 1/2015 | Jeong ...................... H04N 9/12 359/811 |
| 2015/0362638 A1* | 12/2015 | Wang ...................... G02B 5/04 359/831 |
| 2016/0062163 A1 | 3/2016 | Lee et al. |

FOREIGN PATENT DOCUMENTS

| | | |
|---|---|---|
| CN | 104062805 A | 9/2014 |
| CN | 104299519 A | 1/2015 |
| KR | 20160028051 A | 3/2016 |

\* cited by examiner

TILED DISPLAY PANEL AND TILED DISPLAY DEVICE

CROSS-REFERENCE TO RELATED APPLICATION

This application claims the benefit of Chinese Patent Application No. 201610683876.X filed on Aug. 18, 2016 in the State Intellectual Property Office of China, the disclosure of which is incorporated in its entirety herein by reference.

BACKGROUND

Technical Field

Embodiments of the present disclosure relate to a field of display technology, and more particularly, to a tiled display panel and a tiled display device.

Description of the Related Art

With the rapid development of display technology, LFD (large format display) technology is more and more popular. Tiled display technology becomes one of the main ways to achieve a large size display. Since a LCD panel has a lot of advantages, such as high resolution, large viewing angle, low power consumption, etc., the existing tiled display screen usually uses a number of LCD panels as sub-display panels and splices them. However, since each sub-display panel includes opaque frame sealing glue and an opaque border, there is an area that cannot display between adjacent sub-display panels, that is a so-called splice gap or splice area, which seriously affects display effect.

SUMMARY

This section provides a brief overview of the present disclosure, but it is not intended to be representative of the entire contents or all features of the present disclosure.

According to an aspect of the present disclosure, there is provided a tiled display panel, including:
- at least two display areas;
- a splice area disposed between two adjacent display areas;
- a first optical element and a second optical element disposed on the display areas and located on two sides of the splice area, respectively; and
- a reflective element disposed on the splice area, wherein each of the first optical element and the second optical element is configured to direct at least a portion of light emitted from the display area in which it is located to the reflective element, such that the at least a portion of light is reflected by the reflective element and then emitted out from the splice area.

In an exemplary embodiment, each of the first optical element and the second optical element is a total reflection prism including a first face, a second face and a third face, wherein an included angle between the first face and the second face is a right angle, and each of an included angle between the third face and the first face and an included angle between the third face and the second face is an acute angle, and wherein the first face is arranged on the display area, and the second face is arranged to face towards the splice area.

In an exemplary embodiment, the at least a portion of light is emitted into the total reflection prism through the first face and totally-reflected by the third face and then emitted into the reflective element from the second face, and/or at least a portion of light is emitted into the total reflection prism and emitted into the second face from the first face and then emitted into the reflective element from the second face.

In an exemplary embodiment, a diffusion element is provided on the second face.

In an exemplary embodiment, the diffusion element includes one or more of:
- diffusion particles coated on the second face;
- a plurality of triangular microstructures formed on the second face;
- a plurality of outwardly convex arcuate microstructures formed on the second face; and
- a plurality of inwardly concave arcuate microstructures formed on the second face.

In an exemplary embodiment, a width of each of the first optical element and the second optical element is greater than or equal to twice of a width of the splice area.

In an exemplary embodiment, the width of each of the first optical element and the second optical element is less than or equal to three times of the width of the splice area.

In an exemplary embodiment, the reflective element is a reflective layer provided on the splice area.

In an exemplary embodiment, the first optical element and the second optical element are made of PMMA, PS, PC or glass material.

In an exemplary embodiment, the first optical element and the second optical element are adhered to the display areas by optically clear adhesive.

According to another aspect of the present disclosure, there is provided a display device, including the tiled display panel according to any one of the embodiments described herein.

BRIEF DESCRIPTION OF THE DRAWINGS

The drawings described herein are intended to illustrate the selected embodiments in the present disclosure, but are not intended to be representative of all possible embodiments, and are not intended to limit the scope of the present disclosure. In the drawings.

DETAILED DESCRIPTION OF PREFERRED EMBODIMENTS

Exemplary embodiments will now be described in further detail with reference to the accompanying drawings.

Figure 1:
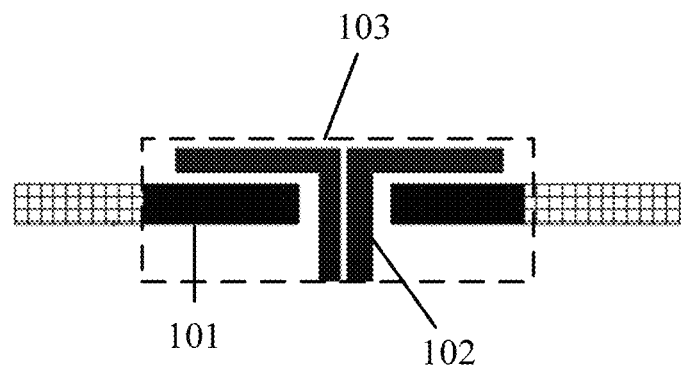
FIG. 1 is a schematic view showing a splice area between two adjacent sub-display panels.
Figure 2:
FIG. 2 is a schematic view showing a dark area in a splice area of a tiled display screen.

FIG. 1 is a schematic view showing a splice area between two adjacent sub-display panels. As shown in FIG. 1, due to the presence of frame sealing glue 101 and a border 102 of each sub-display panel, there is an opaque splice area 103 between two adjacent sub-display panels when they are spliced. Since the splice area is not light-transmitted and cannot achieve an image display, a relatively significantly dark area (see FIG. 2) will appear in the splice area when a large format display is implemented, which will seriously affect the display effect. In order to reduce a width of the splice area, various efforts has been made and it has seen some achievements. The width of the splice area has been reduced from 5.9 mm to less than 2 mm. However, due to the presence of the frame sealing glue in a liquid crystal display panel, the splice area cannot be fundamentally eliminated.

The present disclosure provides a tiled display panel and a tiled display device that are capable of effectively improving the display effect.

According to an aspect of the present disclosure, there is provided a tiled display panel, including: at least two display areas; a splice area disposed between two adjacent display areas; a first optical element and a second optical element disposed on the display areas and located on two sides of the splice area, respectively; and a reflective element disposed on the splice area. In the embodiment of the present disclosure, the first optical element and the second optical element are configured to direct at least a portion of light emitted from the respective display areas to the reflective element, such that the at least a portion of light is reflected by the reflective element and then emitted out from the splice area.

In the tiled display panel according to the embodiment of the present disclosure, by means of providing a reflective element on the splice area and respectively providing a first optical element and a second optical element on two sides of the splice area, at least a portion of light emitted from the display areas may be directed to the splice area and emitted from the splice area. It is possible to increase a brightness in the splice area and thereby reduce a brightness difference between the splice area and the display areas, because the light is emitted from the splice area. In addition, a portion of light from the display areas is directed to the splice area, therefore a portion of image from pixels of the display areas may be transferred to the splice area so that there is also an image display in the splice area. Thus, it can be seen that the display effect can be improved by the tiled display panel according to the embodiment of the present disclosure.

It should be noted that, in the embodiment of the present disclosure, the tiled display panel may include a plurality of sub-display panels, such as liquid crystal display panels or OLED display panels. The "display area" refers to an area of each sub-display panel in which an image can be displayed, that is, an active area. The "splice area" refers to an opaque area between the display areas of two adjacent sub-display panels, for example, the splice area may include the area where the frame sealing glue and the borders of the two adjacent liquid crystal display panels are located.

Figure 3:
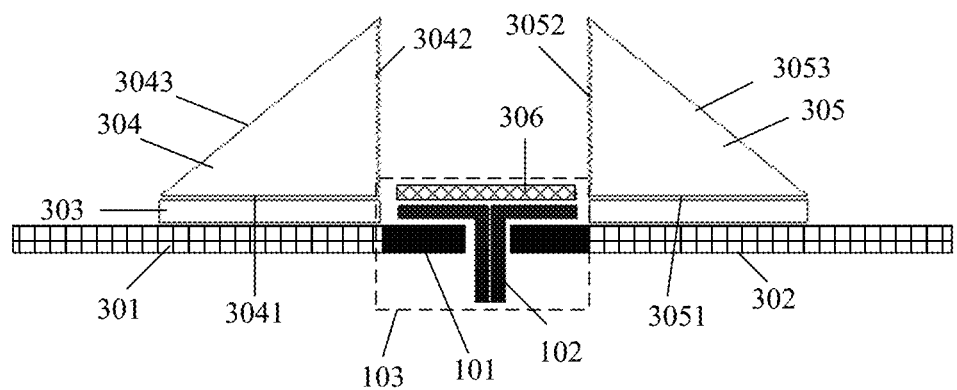
FIG. 3 shows a schematic cross-sectional view of an exemplary tiled display panel according to an embodiment of the present disclosure.

FIG. 3 shows a schematic cross-sectional view of an exemplary tiled display panel according to an embodiment of the present disclosure. As shown in FIG. 3, the tiled display panel includes: a first display area 301; a second display area 302; a splice area 103 disposed between the first display area 301 and the second display area 302; a first optical element 304 disposed at an edge of the first display area 301 adjacent to the splice area 103; a second optical element 305 disposed at an edge of the second display area 302 adjacent to the splice area 103; and a reflective element 306 disposed on the splice area 103.

In an embodiment, the first optical element 304 and the second optical element 305 may be adhered to the display areas by optically clear adhesive (OCA) 303.

In an embodiment, the reflective element 306 may be a reflective layer provided on the splice area, in particular, the reflective element 306 may be a reflective layer coated on the splice area or a reflective film adhered to the splice area.

In an exemplary embodiment, both the first optical element 304 and the second optical element 305 may be a total reflection prism. As shown in FIG. 3, each total reflection prism includes a first face 3041, 3051 arranged on the corresponding display area, a second face 3042, 3052 perpendicular to the first face 3041, 3051 and facing towards the splice area 103, and a third face 3043, 3053, wherein an included angle between the third face 3043, 3053 and the first face 3041, 3051 and an included angle between the third face 3043, 3053 and the second face 3042, 3052 are both acute angles.

Figure 4:
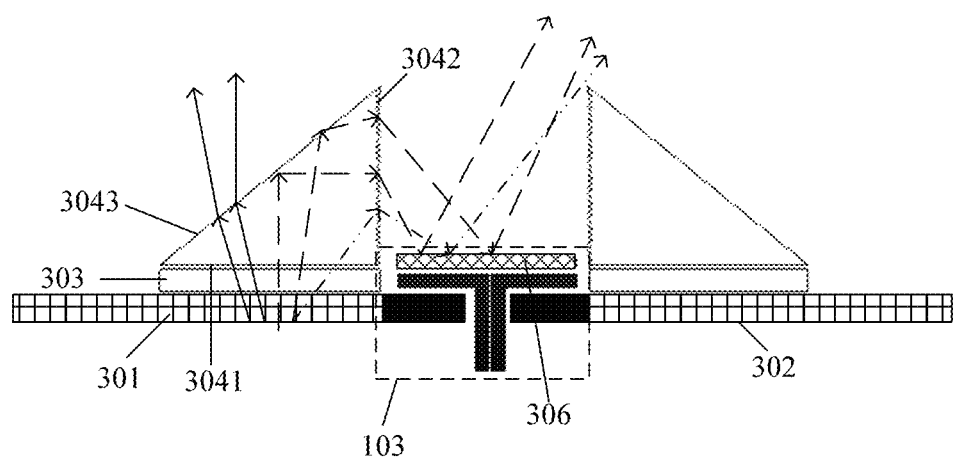
FIG. 4 is a schematic view of an optical path of a tiled display panel according to an embodiment of the present disclosure.

FIG. 4 is a schematic view of an optical path of a tiled display panel according to an embodiment of the present disclosure. As shown in FIG. 4, in an embodiment, the light from the first display area 301 is emitted into the total reflection prism through the first face 3041 and then is partly emitted into the third face 3043. The light whose incident angle is less than a total reflection critical angle (indicated by a solid line arrow) is refracted at an interface between the third face 3043 and air and then is emitted out from the display area, thereby achieving a normal display of the display area. While, the light whose incident angle is greater than or equal to the total reflection critical angle (indicated by a dotted line arrow) is totally-reflected by the third face 3043 and then is emitted into the second face 3042, and the light is emitted into the reflective element 306 from the second face 3042 and then is reflected by the reflective element 306 and emitted out from the splice area. In another embodiment, another portion of the light emitted into the total reflection prism (indicated by a dotted and dashed line arrow) is directly emitted into the second face 3042 and emitted into the reflective element 306 from the second face 3042, then the light is reflected by the reflective element 306 and emitted out from the splice area 103.

In the above description, only the optical path in which the light is directed to the splice area by the total reflection prism located on the first display area 301 is described in detail, but it should be understood that the total reflection prism located on the second display area 302 may direct at least a portion of light emitted from the second display area to the splice area in the same way, therefore, its details will be omitted here.

As described herein and shown in FIG. 4, at least a portion of light from the display areas on two sides is directed to the splice area and is emitted from the splice area, the display brightness of the splice area can be increased. Moreover, a portion of image from the display areas may be transferred to the splice area, so that there is also an image displayed in the splice area. Therefore, according to the tiled display panel in the embodiment of the present disclosure, the dark splice area can be weakened, and the display effect can be improved.

In an embodiment, in order to facilitate directing the light from the second face 3042, 3052 of the total reflection prism to the reflective element 306, a diffusion element may be provided on the second face 3042, 3052 for diffusing at least a portion of light emitted from the second face 3042, 3052 so that it is emitted into the reflective element.

In an exemplary embodiment, the diffusion element may be for example diffusion particles coated on the second face 3042, 3052 of the total reflection prism. In another embodiment, the diffusion element may also be a plurality of triangular microstructures, a plurality of outwardly convex arcuate microstructures or a plurality of inwardly concave arcuate microstructures formed on the second face 3042, 3052 of the total reflection prism. It should be understood that the implementations of the diffusion element (i.e., surface structure of the second face of the total reflection prism) are not limited to the embodiments described herein, and any surface structures capable of directing the light emitted from the second face to the reflective element are applicable to the present disclosure.

Figure 5:
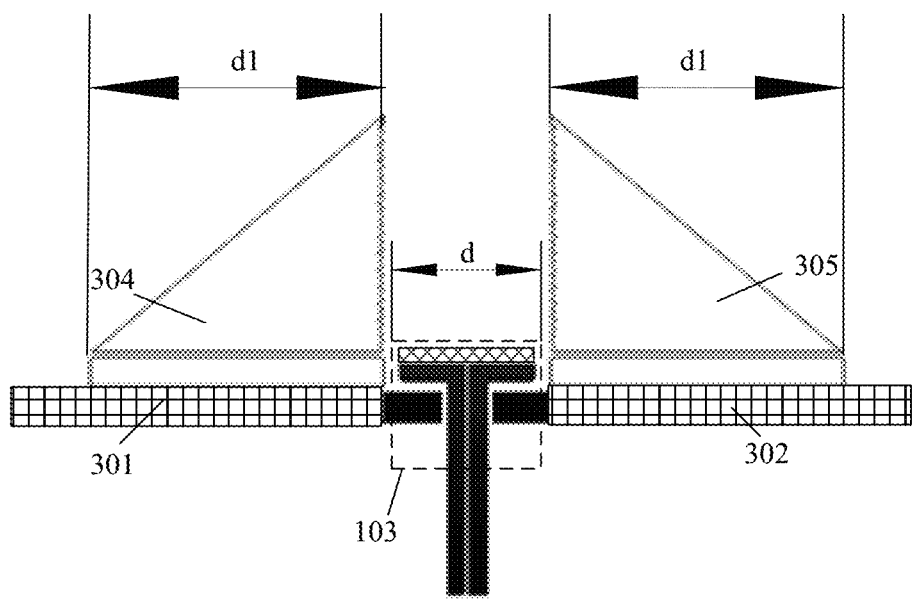
FIG. 5 shows a relationship between a width of a first/second optical element and a width of a splice area in a tiled display panel according to an embodiment of the present disclosure.

In the embodiment of the present disclosure, in order to direct the light from the display areas to the splice area without affecting the normal display of the display areas, width d1 of the first optical element and the second optical element may be set as: d1≥2 d, optionally, 3 d≥d1≥2 d, where d is a width of the splice area, as shown in FIG. 5.

In order to allow the first optical element 304 and the second optical element 305 to cause total reflection of at least a portion of light from the display areas, the refractive index of the material forming the first optical element 304 and the second optical element 305 should be greater than the refractive index of the air. In an exemplary embodiment, the first optical element and the second optical element may be made of PMMA, PS, PC, or glass material.

It should be noted that, in the embodiments described herein, the present disclosure has been described in detail with reference to examples in which a total reflection prism is taken as the first optical element and the second optical element, but it should be understood that the first optical element and the second optical element may not be limited to the total reflection prism, and they may be any optical elements capable of directing light to the splice area or any optical systems formed from a combination of different optical elements, for example, they may be a lens, a prism, an optical waveguide, or a combination thereof, or an equivalent lens or an equivalent prism formed from liquid crystal layers. In addition, the structures of the first optical element and the second optical element may be the same or different.

It should also be noted that, in the description herein, it describes that at least a portion of light from the display areas is directed to the splice area only in the case of the tiled display panel consisting of two display area (i.e., the tiled display panel is formed from two sub-display panels), however, it should be understood that, if the tiled display panel has a plurality of display areas (i.e., the tiled display panel is formed from more than two sub-display panels), the light from the other display areas can be directed to the corresponding splice area in a similar manner, so as to weaken the dark splice area and improve the display effect.

According to another aspect of the present disclosure, there is also provided a tiled display device, including the tiled display panel according to any one of the embodiments described herein.

In the tiled display device according to the embodiment of the present disclosure, at least a portion of light emitted from the display areas may be directed to the splice area and emitted from the splice area. It is possible to increase brightness in the splice area and thereby reduce brightness difference between the splice area and the display areas, because the light is emitted from the splice area. In addition, a portion of light from the display areas is directed to the splice area, therefore a portion of image from the display areas may be transferred to the splice area so that there is also an image displayed in the splice area. Thus, it can be seen that the display effect can be improved by the tiled display device according to the embodiment of the present disclosure.

In summary, in the tiled display panel and the tiled display device according to the embodiments of the present disclosure, by means of providing the first optical element and the second optical element in the display areas and providing the reflective element in the splice region, it can direct the light from the display areas to the splice area and allow it to be emitted from the splice area, therefore the brightness difference between the display areas and the splice area can be reduced, and an image can be displayed on the splice area, thereby improving the display effect of the tiled display panel and the tiled display device.

For the purposes of describing surfaces below, the terms "up", "down", "left", "right", "vertical", "horizontal", "top", "bottom" and derivatives thereof should be interpreted with reference to the directions in the drawings. The terms "on • • • • • •", "above • • • • • •", "over • • • • • •" or "upon • • • • • •" mean that a first element such as a first structure is located on a second element such as a second structure, but an intermediate element such as an interface structure may be provided between the first element and the second element. The term "directly contact" means a first element such as a first structure is connected to a second element such as a second structure, but there is no intermediate conductive layers, insulation layers or semiconductor layers at the interface of the two elements.

Unless expressly otherwise stated in the context, a singular form of word used in the description and the appended claims includes a plurality of elements, and vice versa. Thus, if a singular form is mentioned, the plural form of the corresponding term is usually included. Similarly, the words "comprise" and "include" will be interpreted to be inclusive, but not exclusive. Likewise, the terms "contain" or "or" should be interpreted to be inclusive, unless it is expressly stated that such explanation is forbidden in the context. The term "example" used herein, in particular when it is located after a set of terms, it means that the listed "example" is merely exemplary and illustrative, but should not be interpreted to be exclusive or universal.

The foregoing description of the embodiments has been provided for the purpose of illustration and description. It is not intended to be exhaustive or to limit the present disclosure. The various elements or features of a particular embodiment are not generally limited to be used in this particular embodiment, but if appropriate, these elements and features may be interchangeable and may be used in other selected embodiment, even if no specific indication or description. Similarly, changes may be made in many ways. Such changes should not be regarded as a departure from the present disclosure, and all such changes are intended to be included within the scope of the present disclosure.

The invention claimed is:

1. A tiled display panel, comprising:
    at least first and second adjacent display areas;
    a splice area disposed between the first and second adjacent display areas;
    a first optical element and a second optical element respectively disposed on the first display area and the second display area and located on two sides of the splice area; and
    a planar reflective element disposed on the splice area, having a reflective surface that is parallel to light exiting surfaces of the display areas,
    wherein each of the first optical element and the second optical element is configured to direct at least a portion of light emitted from the first display area and the second display area, respectively, to the reflective element, such that the at least a portion of light is reflected by the reflective element and then emitted out from the splice area, wherein each of the first optical element and the second optical element is a total reflection prism comprising a first face, a second face and a third face, wherein an included angle between the first face and the second face is a right angle, and each of an included angle between the third face and the first face and an included angle between the third face and the second face is an acute angle, and wherein the first face is arranged on a respective display area, and the second face is arranged to face towards the splice area.

2. The tiled display panel according to claim 1, wherein the at least a portion of light is emitted into the total reflection prism through the first face and totally-reflected by the third face and then emitted into the reflective element from the second face, and/or the at least a portion of light is emitted into the total reflection prism from the first face and directly emitted into the second face, and then emitted into the reflective element from the second face.

3. The tiled display panel according to claim 2, wherein a diffusion element is provided on the second face.

4. The tiled display panel according to claim 3, wherein the diffusion element comprises one or more of:
diffusion particles coated on the second face;
a plurality of triangular microstructures formed on the second face;
a plurality of outwardly convex arcuate microstructures formed on the second face; and
a plurality of inwardly concave arcuate microstructures formed on the second face.

5. The tiled display panel according to claim 4, wherein a width of each of the first optical element and the second optical element is greater than or equal to twice of a width of the splice area.

6. The tiled display panel according to claim 5, wherein the width of each of the first optical element and the second optical element is less than or equal to three times of the width of the splice area.

7. The tiled display panel according to claim 3, wherein a width of each of the first optical element and the second optical element is greater than or equal to twice of a width of the splice area.

8. The tiled display panel according to claim 7, wherein the width of each of the first optical element and the second optical element is less than or equal to three times of the width of the splice area.

9. The tiled display panel according to claim 2, wherein a width of each of the first optical element and the second optical element is greater than or equal to twice of a width of the splice area.

10. The tiled display panel according to claim 9, wherein the width of each of the first optical element and the second optical element is less than or equal to three times of the width of the splice area.

11. The tiled display panel according to claim 1, wherein a width of each of the first optical element and the second optical element is greater than or equal to twice of a width of the splice area.

12. The tiled display panel according to claim 11, wherein the width of each of the first optical element and the second optical element is less than or equal to three times of the width of the splice area.

13. The tiled display panel according to claim 1, wherein the reflective element is a reflective layer provided on the splice area.

14. The tiled display panel according to claim 1, wherein the first optical element and the second optical element are made of PMMA, PS, PC or glass material.

15. The tiled display panel according to claim 1, wherein the first optical element and the second optical element are adhered to the first and second display areas, respectively, by optically clear adhesive.

16. A display device, comprising the tiled display panel according to claim 1.

17. A tiled display panel, comprising:
at least first and second adjacent display areas;
a splice area disposed between the first and second adjacent display areas;
a first optical element and a second optical element respectively disposed on the first display area and the second display area and located on two sides of the splice area; and
a reflective element disposed on the splice area,
wherein each of the first optical element and the second optical element is configured to direct at least a portion of light emitted from the first display area and the second display area, respectively, to the reflective element, such that the at least a portion of light is reflected by the reflective element and then emitted out from the splice area,
wherein each of the first optical element and the second optical element is a total reflection prism comprising a first face, a second face and a third face,
wherein the at least a portion of light is emitted into the total reflection prism through the first face and totally-reflected by the third face and then emitted into the reflective element from the second face, and/or the at least a portion of light is emitted into the total reflection prism from the first face and directly emitted into the second face, and then emitted into the reflective element from the second face, and
wherein a diffusion element is provided on the second face which is a planar face and is perpendicular to the first display area and the second display area.

18. The tiled display panel according to claim 17 wherein the diffusion element comprises one or more of:
diffusion particles coated on the second face;
a plurality of triangular microstructures formed on the second face;
a plurality of outwardly convex arcuate microstructures formed on the second face; or
a plurality of inwardly concave arcuate microstructures formed on the second face.

19. The tiled display panel according to claim 17, wherein a width of each of the first optical element and the second optical element is greater than or equal to twice of a width of the splice area.

20. The tiled display panel according to claim 17, wherein the first optical element and the second optical element are made of PMMA, PS, PC or glass material.

* * * * *